(12) United States Patent
Otterson et al.

(10) Patent No.: US 6,244,366 B1
(45) Date of Patent: *Jun. 12, 2001

(54) CART TRANSPORTER

(75) Inventors: Daniel L. Otterson, Stacy; Paul F. Stephan, Brook Park, both of MN (US)

(73) Assignee: Smarte Carte, Inc., St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/908,537

(22) Filed: Aug. 7, 1997

(51) Int. Cl.$^7$ ................. B62D 7/14; B62D 51/04
(52) U.S. Cl. ............ 180/11; 180/19.1; 280/33.992
(58) Field of Search ............ 180/11, 19.1, 19.3, 180/21; 280/33.991, 33.992

(56) References Cited

U.S. PATENT DOCUMENTS

| | | |
|---|---|---|
| 2,879,858 | 3/1959 | Thomas . |
| 3,312,300 | 4/1967 | Jones . |
| 4,185,711 | 1/1980 | Lawrence et al. . |
| 5,082,074 | 1/1992 | Fischer . |
| 5,322,306 * | 6/1994 | Coleman ................ 280/33.992 |
| 5,439,069 | 8/1995 | Beeler . |
| 5,573,078 * | 11/1996 | Stringer et al. ............ 180/19.2 |
| 5,860,485 * | 1/1999 | Ebbenga ................. 180/19.2 |
| 5,934,694 * | 8/1999 | Schugt et al. ............ 280/33.991 |

FOREIGN PATENT DOCUMENTS

| | | |
|---|---|---|
| 23 50 308 | 4/1975 | (DE) . |
| 24 50 692 | 4/1976 | (DE) . |
| WO 90/11922 | 10/1990 | (WO) . |

* cited by examiner

Primary Examiner—Lanna Mai
Assistant Examiner—Jeff Restifo
(74) Attorney, Agent, or Firm—Merchant & Gould PC (57) ABSTRACT

A power operated vehicle, of the type guided by a walking attendant, for conveying a plurality of nestable carts. The vehicle has a main body portion and is supported by a front rotatable caster and two rear drive wheels mounted on an axle. The drive wheels are in differential and are driven by a motor connected to a power supply. A control handle is offset to the side for controlling the operation of the vehicle. An adjustable hitch is attached to the rear for accepting the lead nestable cart. The adjustable hitch pivots at a point proximal the axle. The adjustable hitch pivots independent of the movement of the vehicle.

14 Claims, 7 Drawing Sheets

CART TRANSPORTER

TECHNICAL FIELD

This invention generally relates to an apparatus for conveying a plurality of carts. More particularly, the invention relates to a power-operated vehicle, of the type guided by a walking attendant for pulling a plurality of nestable carts.

BACKGROUND

Carts are used to transport items in commercial establishments, such as groceries in supermarkets and luggage in airports. Customers place their items into such carts in order to transport the items to their parked vehicle or other destinations. When customers are done with the carts, the carts are often placed in remote collection areas or simply left unattended. Customers often do not return the carts to a central collection area, so these carts must be manually returned to the central collection area. Various attempts have been made to persuade customers to return carts, but the majority of carts remain unreturned. In addition, it is also necessary to move carts from one collection area to another, so as to keep an even distribution of carts for later rentals.

The collection of such carts can be expensive from both a labor and time standpoint. Typically, these hand-pushed carts nest within one another from front to rear. A long-nested string of such carts is easy to form but extremely difficult to manually maneuver due to the weight of the carts and the limited turning radius of the string of carts. Recently, power-operated vehicles have been used to collect and convey the carts. Such power-operated vehicles include U.S. Pat. No. 5,082,074 to Fischer and U.S. Pat. No. 5,439,069 to Beeler.

Existing power-operated vehicles have many shortcomings. Such vehicles are difficult to maneuver and control because they have a limited turning radius, such that the nested carts are not able to be maneuvered around sharp corners. However, turning the carts at too high of an angle may damage the front wheels. In addition, many of the existing power-operated vehicles push the carts from the rear. This presents additional maneuverability problems, and safety concerns. Pushing a string of carts down a slope runs the dangerous risk of the carts unnesting under their own weight. Also, when pushing a long string of nested carts, the operator is unable to see the path that is directly in front of the first cart. The longer the line of carts, the greater that this blind spot becomes. This presents significant safety problems, particularly in an airport where there are many people moving through congested areas. In order for the operator to safely maneuver the long string of carts, the operator should be at the front of the carts so that he or she may see the path that the carts are taking, and watch out for any pedestrians or other obstacles.

Another disadvantage associated with existing cart conveyers is that the nested carts are difficult to reload into the cart collection area. The nested line of carts must be precisely guided into the cart collection area, which is difficult when pushing from behind. Often, one must release the nested carts and manually maneuver each individual cart into the collection area.

Therefore, a need exists for an apparatus for conveying nestable carts that is highly maneuverable, easy to reload, and safe.

SUMMARY

The present invention provides a power operated vehicle, of the type guided by a walking attendant, for conveying a plurality of nestable carts. The vehicle has a main body portion having a forward end and a trailing end and disposed about a longitudinal axis. A caster rotates about a vertical axis and is connected to the main body portion along the longitudinal axis and adjacent the forward end of the main body portion. Two drive wheels are coaxially mounted along opposite ends of an axle, adjacent the trailing end. The axle is disposed perpendicular to the longitudinal axis. A motor is connected to the axle and is electrically connected to a power supply. A hitch is pivotably mounted to the main body portion. The hitch pivots at a point proximal to the axle along the longitudinal axis of the main body portion, such that the hitch pivots independent of the movement of the main body portion.

DETAILED DESCRIPTION

A preferred embodiment of the invention will be described in detail with reference to the drawings, wherein like reference numerals represent like parts and assemblies throughout the several views. Reference to the preferred embodiment does not limit the scope of the invention, which is limited only by the scope of the claims attached hereto.

In general, the present invention relates to an apparatus for conveying a plurality of nestable carts. The invention provides a power operated vehicle capable of being guided by a walking attendant. The vehicle has two rear drive wheels in differential and a front rotatable caster. A control handle is offset to the side, and an adjustable hitch is attached to the rear for accepting the lead nestable cart. The adjustable hitch pivots at a point proximal to the axle which allows a string of nestable carts to be turned on a sharper radius. Depending on the embodiment that is used, the invention allows for increased maneuverability, increased efficiency in the collection and delivery of nestable carts, and improved operational safety.

The present invention has many advantages. One advantage is that it allows for greater maneuverability of a string of nested carts. The rotatable caster and drive wheel differential allow a zero turning radius of the vehicle when no carts are attached. With a string of nested carts attached, the hitch pivots through an angle of about 50° to 60°, thereby allowing the vehicle to guide the carts around sharper corners. The turning radius also prevents the carts from turning too quickly which can result in wheel damage. The present invention provides other advantages as well. The control handle allows for a walking attendant to control the vehicle with one hand from a position where obstacles and hazards can be easily seen and avoided. Another advantage includes the increased efficiency in the collection and delivery of the carts to a central collection area.

Figure 1:
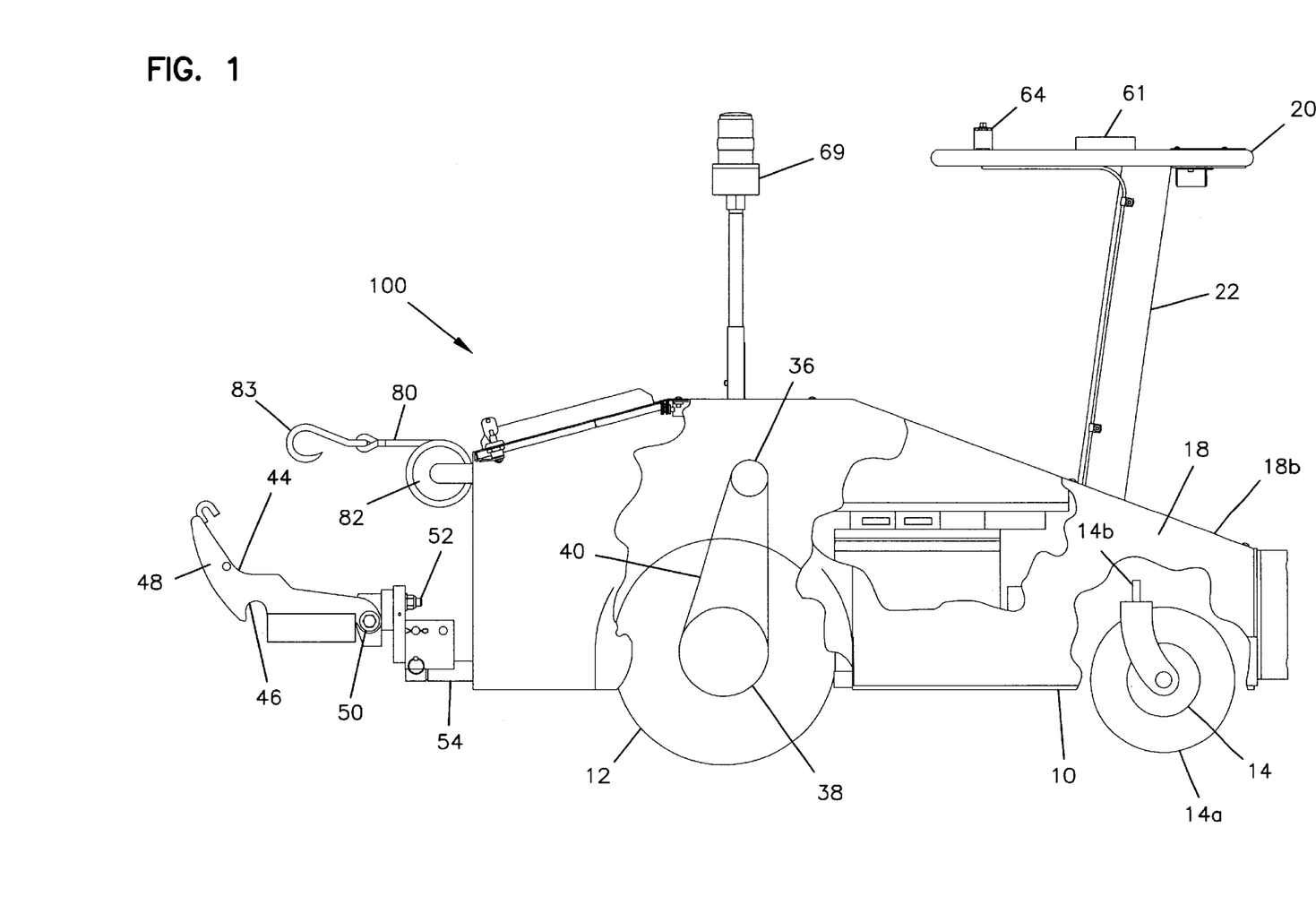
FIG. 1 is a schematic side view, partially in section, of a first embodiment of the apparatus of the present invention.
Figure 2:
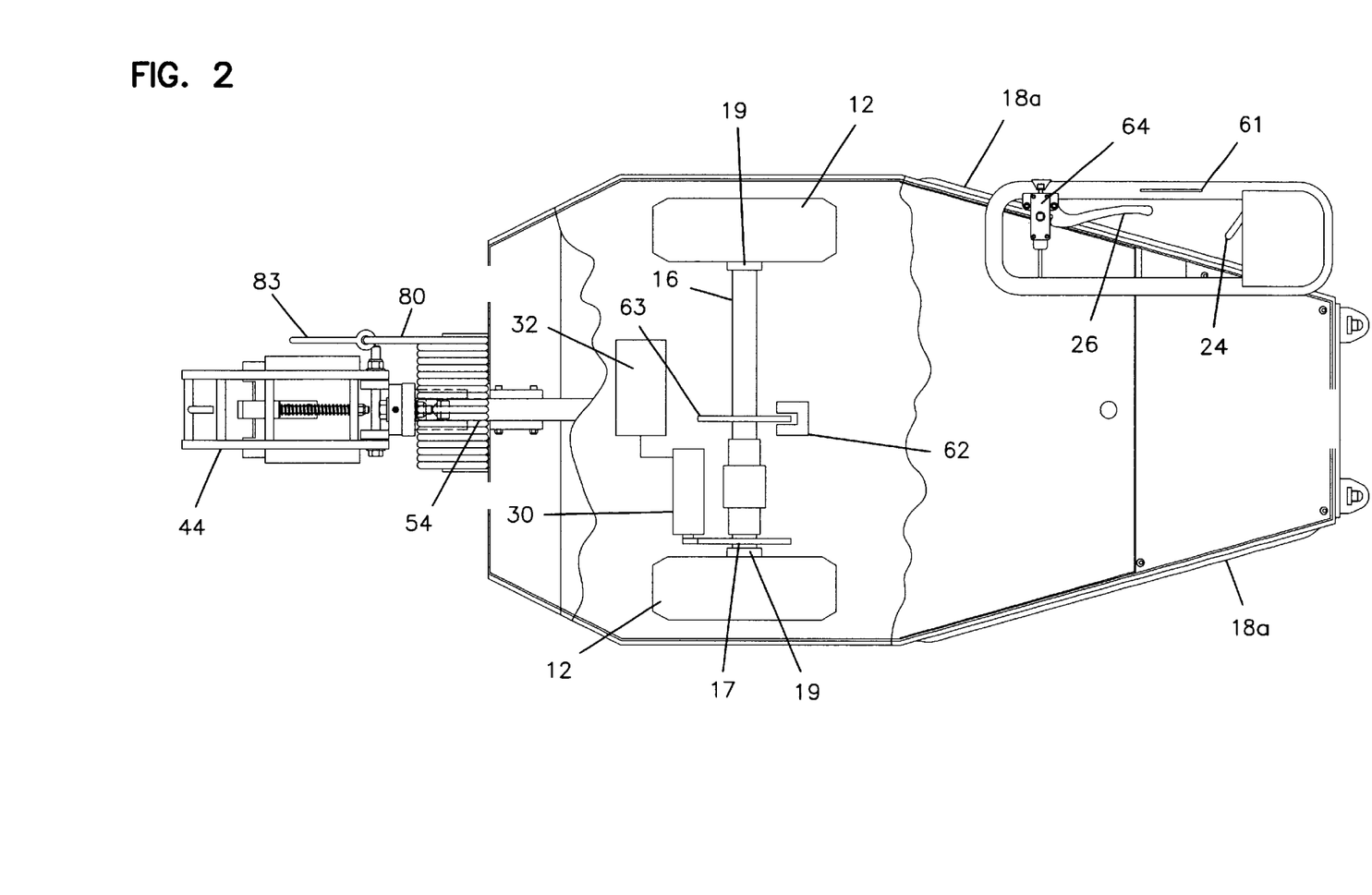
FIG. 2 is a schematic top view, partially in section, of a first embodiment of the apparatus of the present invention.

Referring now to FIGS. 1–2, a cart conveying vehicle, generally shown as 100, is configured for conveying a plurality of nestable carts. The vehicle 100 has a main frame 10 which supports a pair of oppositely disposed drive wheels 12 at the rear end of the vehicle and a caster 14 at the forward end of the vehicle. The wheels 12 are oppositely disposed on an axle 16 and the axle 16 contains a differential 17. The caster 14 comprises a tire 14a, a vertical axle 14b, and is of construction well known in the art. Caster 14 is mounted to the main frame 10. The vertical axle 14b allows the caster 14 to rotate 360°. The full rotation of the caster improves the overall maneuverability of the cart.

The main frame 10 has an outer cover 18. The cover 18 shields the inner parts of the vehicle 100, such as a motor 30 and the axle 16, from adverse ambient conditions. Ambient conditions such as water and particulate matter can ruin or degrade the inner parts of the vehicle. A portion of the cover 18 is removable for access to the inner parts of the vehicle. The cover 18 is attached to the main frame 10 and is constructed of substantially rigid material such as sheet metal. The shape of the cover 18 is designed to prevent an attendant from riding on the vehicle. The cover 18 has sloped side walls 18a that slant towards the front of the vehicle and a sloped front wall 18b that slant upwardly toward the center of the vehicle. This shape improves the safety of the vehicle in that persons are deterred from standing or sitting on the vehicle.

A handle 20 is adjacent and offset from the front end of the vehicle. A bracket 22 is disposed vertically and connects the main frame 10 to the handle 20. The handle 20 has an accelerator 24, a brake lever 26, and a safety switch 61. The accelerator 24 and safety switch 61 must be engaged in order for the vehicle to operate. The accelerator 24 controls the speed of the vehicle. The extent of pivotal movement of the accelerator 24 determines the amount of current to be supplied to the motor 30 and thus the speed of the vehicle. The accelerator 24 and safety switch 61 are electrically connected to the motor 30 such that releasing either will cut power to the motor 30 thereby causing the vehicle to decelerate and stop. Engaging the brake lever 26 stops the vehicle. Other conventional braking mechanisms can be incorporated into the vehicle, such as an automatic brake that engages when the accelerator 24 is released.

The handle 20 is offset from center to improve maneuverability and enhance safety. The vehicle is designed to be operated with one hand so that the operator can use the other hand for necessary functions such as opening doors and removing obstacles. In operation, an operator stands to the front side of the vehicle with one hand grasping the handle 20 to control the operation of the vehicle. The safety switch 61 is configured such that the palm of the operator's hand engages the switch when grasping the handle 20, leaving the rest of the hand free to control the accelerator 24 and brake lever 26. The accelerator 24 and brake lever 26 are configured such that the operator can conveniently operate both mechanisms with the same hand that engages the safety switch 61. The accelerator 24 is conveniently operated with the index finger.

The location of the handle 20 proximal the rotatable caster 14 and the distribution of the weight of the vehicle enhances vehicle maneuverability. The weight of the vehicle is substantially concentrated over the drive axle 16. This maximizes the traction of the drive wheels 12 and reduces the weight on the caster 14. This combination of weight distribution and location makes the vehicle easier to turn. In addition, the location of the handle 20 allows the operator to guide the vehicle from a forward position where the vehicle path and hazards are easily seen. This enhances safety.

The motor 30 is supported by the main frame 10. A sprocket 36 is connected to the drive end of the motor 30. A larger sprocket 38 is connected to the end of the axle 16 and is proximal to the sprocket 36. A chain 40 engages the sprocket 36 and larger sprocket 38 such that there is a speed reduction drive between the motor 30 and the drive wheels 12 thereby providing a large torque output. The axle 16 includes a conventional differential 17 such that the drive wheels 12 can rotate in opposite directions. The motor 30 is electrically connected to a battery 32. The battery 32 is supported by the main frame 10.

The drive wheels 12 are oppositely disposed on the axle 16 via bearings 19. Conventional braking mechanisms are used to stop the vehicle. In one embodiment, the breaking mechanism consists of a hydraulic brake caliper 62 supported by the main frame 10, a brake disk 63 rigidly connected to the axle 16, and a master cylinder 64 located on the handle 20. When the brake lever 26 is engaged, the master cylinder 64 actuates the hydraulic brake caliper 62 which presses against the brake disk 63 thereby slowing down the vehicle.

A protective bracket (not shown) is mounted to the frame 10 below the axle 16. The bracket protects the axle 16, differential 17, and breaking mechanism from obstacles on the surface such as potholes, curbs, and speed bumps. The motor 30, battery 32, and other inner parts of the vehicle are located such that the center of gravity of the vehicle is substantially centered over the center of axle 16. As mentioned, this distribution of weight enhances traction and maneuverability.

Figure 3:
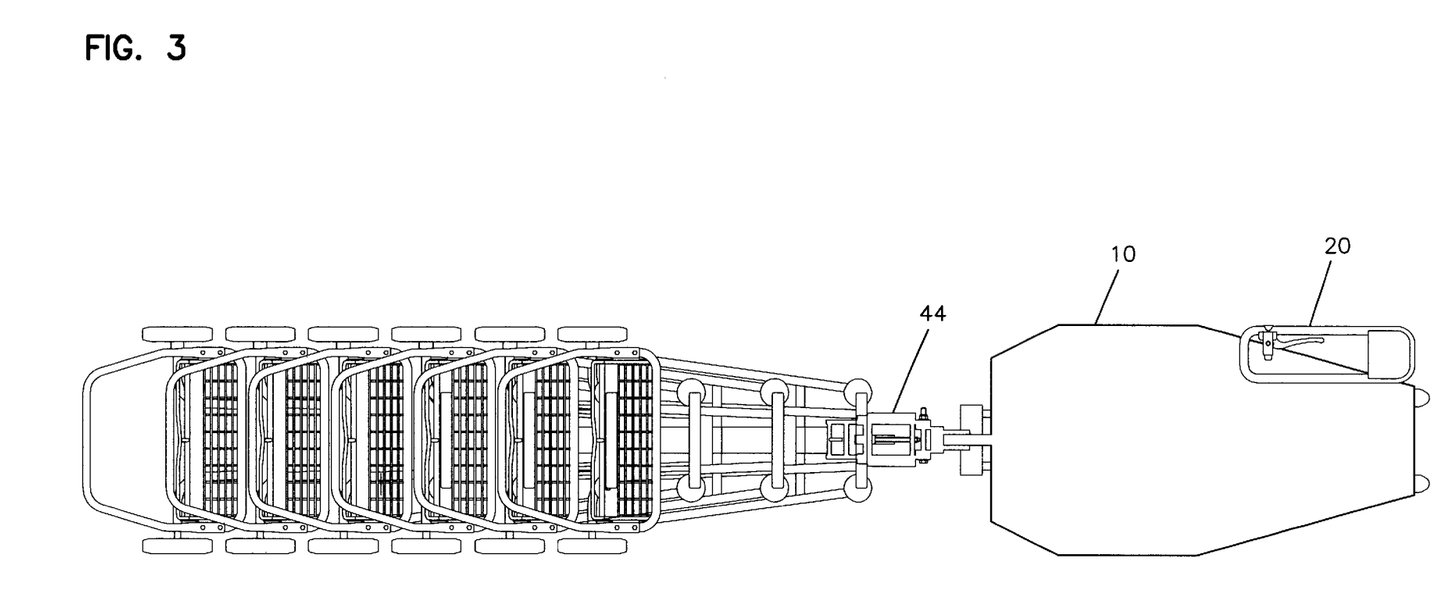
FIG. 3 is a schematic top view of a first embodiment of the apparatus of the present invention conveying a string of nestable carts.

A hitch 44 is located at the rear end of the vehicle for attaching the lead nested cart. The hitch 44 has a spring biased latching means for securing the front bar of the cart. FIG. 3 shows the top view of the front bar interlocking with the hitch 44 along with a string of carts nested within the front cart. The front bar of the lead cart is secured within a retaining slot 46. The front bar is guided into the retaining slot 46 by the curved edge 48 as the hitch vertically pivots about a pivot bar 50. The pivot and resulting vertical movement of the hitch allows for a more efficient collection of carts because the hitch 44 can adjust to compensate for differences in the height of the front bar of different carts. Also, the hitch swivels about swivel bar 52. This swivel also increases the collection efficiency of the carts.

Figure 4:
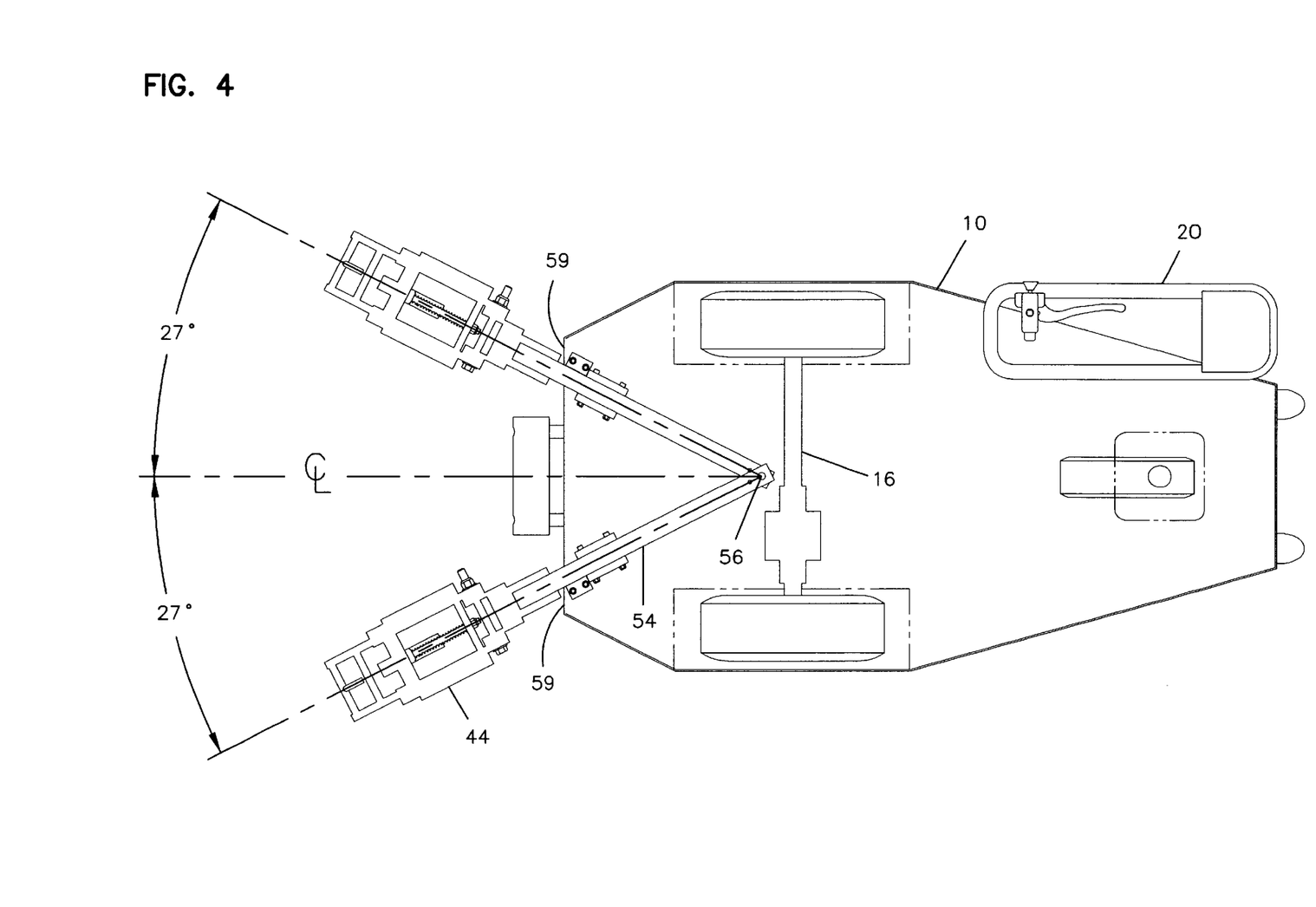
FIG. 4 is a top view, partially in section, of a first embodiment of the apparatus of the present invention showing the pivoting range of the hitch bracket.

FIG. 4 is a top view of the vehicle showing the hitch 44 in two positions. The hitch 44 is connected to a bracket 54. The bracket 54 is pivotably connected to the main frame 10 by a pivot bearing 56. The pivot bearing 56 is located near the axle 16. This distance between the pivot bearing 56 and axle 16 is minimized in order to improve control. The force of the attached string of carts is focused at the pivot bearing 56, so a shorter distance between the pivot bearing 56 and axle 16 improves stability. The location of the pivot bearing below the axle also has the advantage of preventing the front of the vehicle from lifting off the ground under extreme loads. Such extreme loads occur when the vehicle is starting, traveling up an incline, or accelerating. In addition, the pivot bearing 56 allows the hitch to pivot independently of the direction of the vehicle which improves maneuverability and control. The pivot bearing 56 is located along the longitudinal axis of the vehicle and below the centerline of the axle 16. The pivot bearing 56 is located within 2 cm to 8 cm of the axle 16, and preferably 5.3 cm behind the axle 16. The pivot bearing 56 is located within 5 cm below the axle 16, and preferably 3 cm below the axle.

The bracket 54 pivots through an angle. The pivot angle of bracket 54 is limited by stops 59. Stops 59 are connected to the main frame 10 at the rear end of the vehicle. Stops 59 are made of sufficiently rigid material as to withstand repeated wear by the bracket 54.

Figure 5:
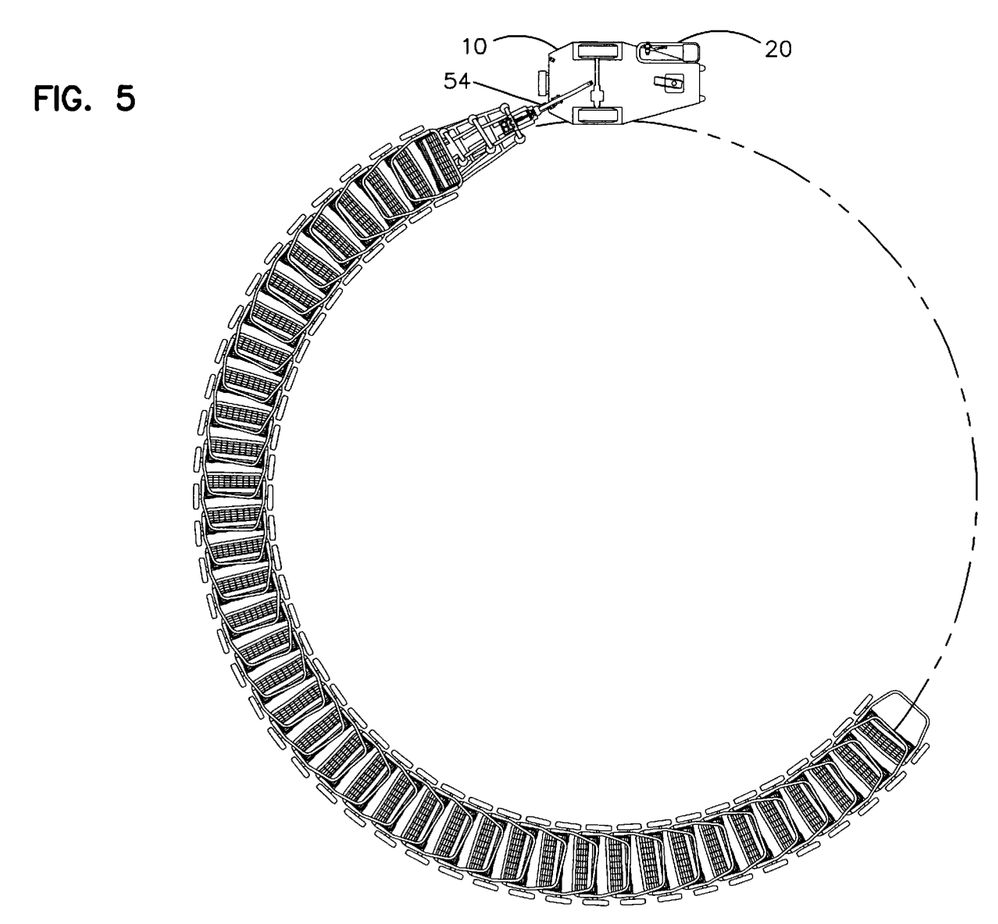
FIG. 5 is a top view of a first embodiment of the apparatus of the present invention showing the turning radius of the vehicle conveying a string of nested carts.

The pivot angle of the hitch bracket 54 determines the overall turning radius of the string of nested carts. FIG. 5 shows the vehicle making a sharp turn, resulting in the full pivot of the hitch bracket 54 and corresponding turning of the nested carts. The bracket pivot angle is designed to maximize maneuverability and to maintain control over the nested carts. The pivoting of the bracket 54 reduces the problem commonly known as "jackknifing." This occurs when the vehicle is attempting to turn too sharply, and the nested carts cannot turn with the vehicle. The force of the nested carts continues to push the vehicle along the path of the nested carts and resists movement along the path of the vehicle. As a result, the rear end of the vehicle is pushed by the force of the nested carts thereby causing a loss of control over the vehicle. The pivoting of the bracket and the short distance between the pivot bearing 56 and axle 16 prevent this "jackknifing." The pivot angle of the hitch bracket 54 substantially matches the minimum turning radius of the string of carts so that the vehicle cannot be turned sharper that a string of carts. This prevents "jackknifing." The bracket pivot angle is about 50° to 60° and is preferably 54° as is shown in the drawings.

Figure 6:
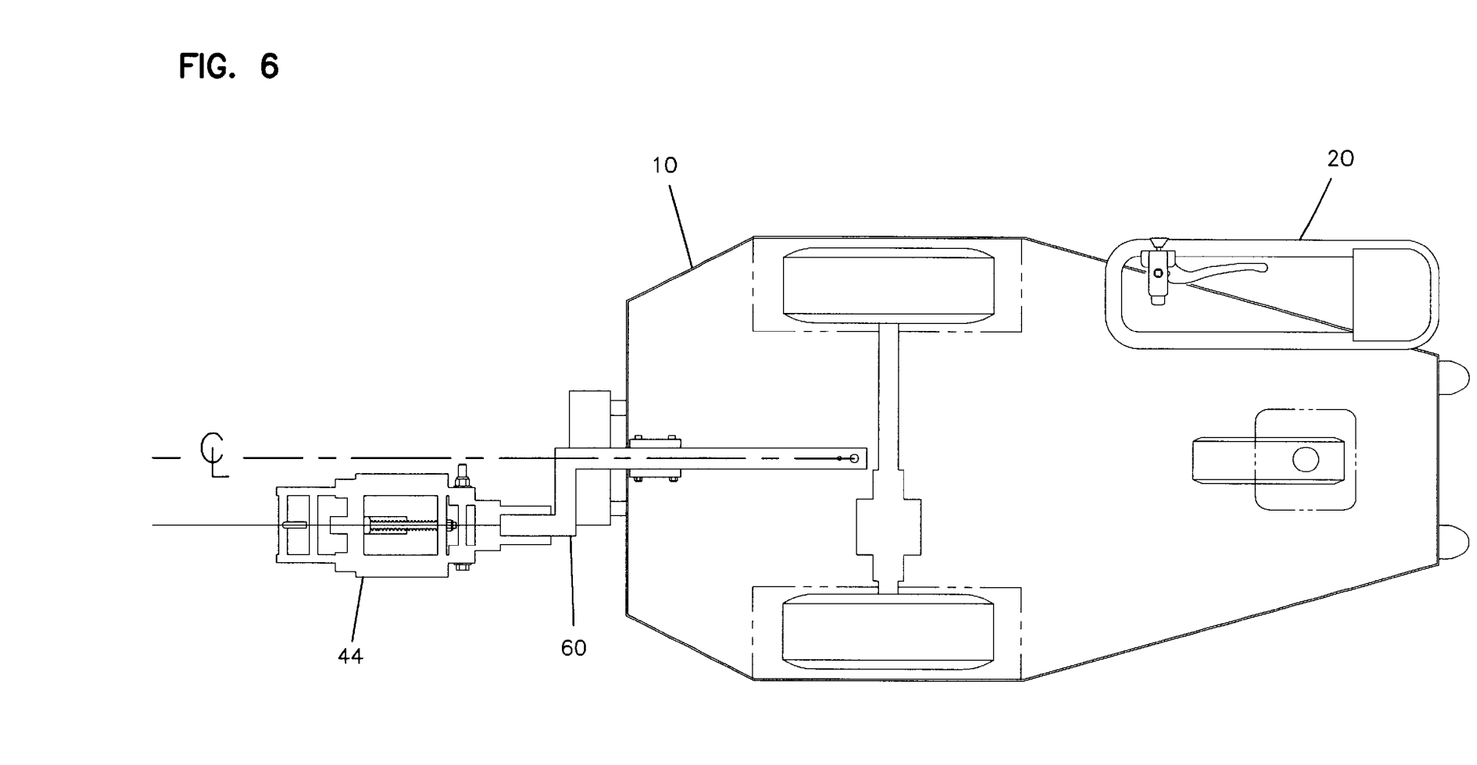
FIG. 6 is a fragmented top view, partially in section, of an alternative embodiment of the apparatus of the present invention, showing an offset hitch bracket.

FIG. 6 is an alternative embodiment of the present invention showing an offset hitch bracket 60. The offset hitch bracket 60 is offset such that the path of nested carts is offset from the path of the vehicle. The offset distance is set such that the outside wheel of each nested cart travels in a path outside the vehicle path. The outside wheel of each cart is guided into a cart collection area without removing the string of carts from the vehicle. The offset decreases the amount of time needed to deposit the carts in a collection area.

The vehicle has several additional control features. A signal light 69 is disposed vertically from the approximate center of the vehicle. The signal light 69 is activated when the motor is on and acts to warn pedestrians that the vehicle is approaching. The motor 30 has a reversing switch (not shown) to move the vehicle in the reverse direction. The reverse switch is designed to activate a warning beeper when the vehicle is operated in reverse. A key switch (not shown) activates the vehicle and is provided to prevent unauthorized operation of the vehicle. The internal workings of such control features are well known.

With no carts attached, the vehicle is highly maneuverable. The drive wheel differential 17 and caster 14 allow the vehicle to fully rotate with a turning radius of substantially zero. The vehicle does not require a turning radius to complete a full turn. This is advantages where the vehicle is operated within a small area, as is common in airports and other commercial establishments. This minimal turning radius provides advantages with a string of carts attached. The string of carts is more maneuverable.

Also, the force that the carts exert on the vehicle has minimal effect on the overall handling of the vehicle.

To begin the collection process, a lead cart is attached to hitch 44. A front bar on the lead cart is secured in the hitch retaining slot 46 by a spring biased latching means. After the lead cart is attached to the hitch 44, multiple carts are nested within the lead cart. Next, the string of carts is secured to the cart using conventional methods. In one embodiment, a rope schematically illustrated at 80 in FIG. 1, is attached from the vehicle to the rear cart to prevent the carts from breaking away and to ensure a firmly nested string of carts. The rope is wound about a drum 82 and has a fastening hook 83 to attach to the rear cart. The drum is attached to the vehicle.

Figure 7:
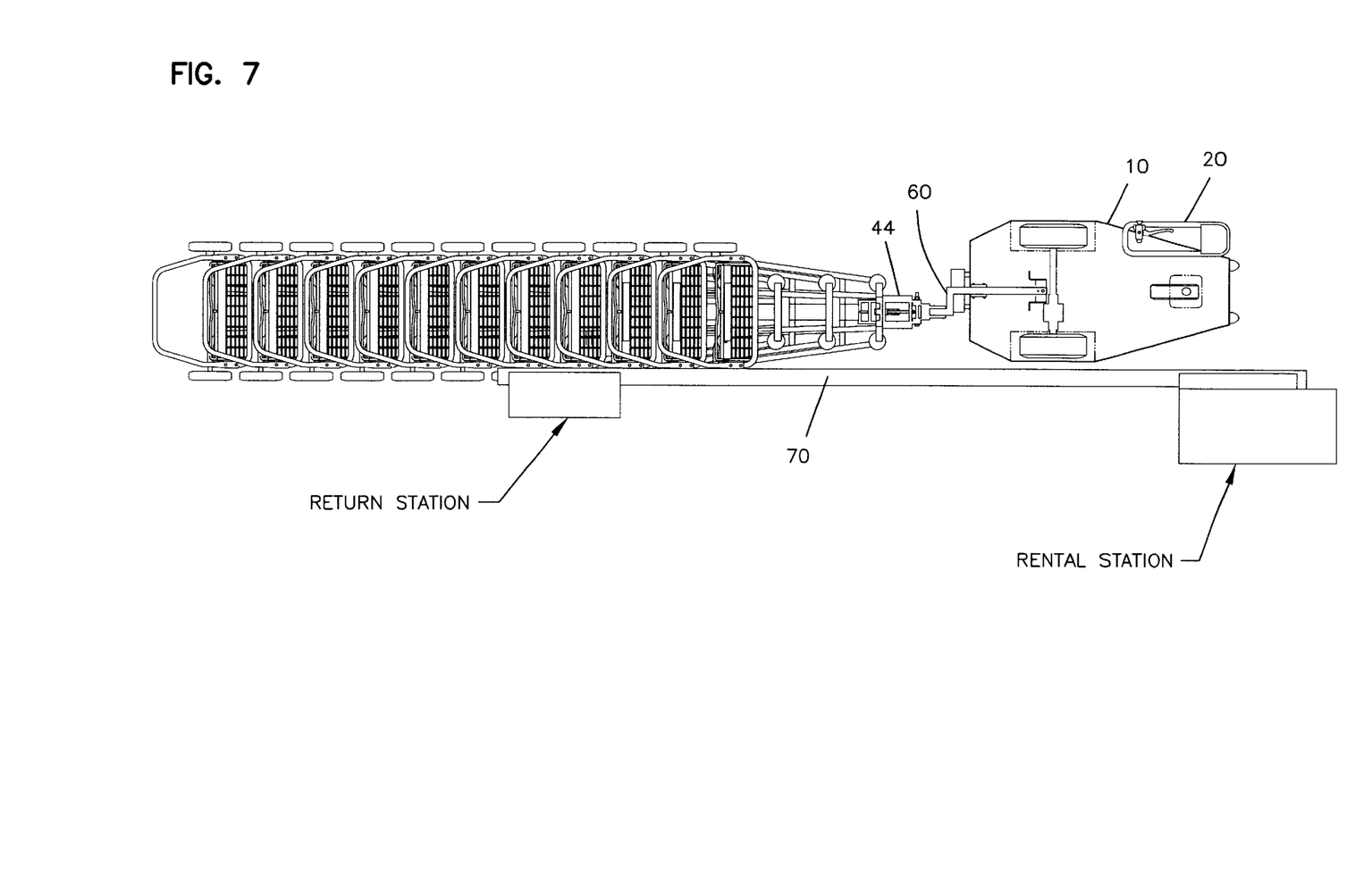
FIG. 7 is a top view showing an alternative embodiment of the apparatus of the present invention showing a vehicle with an offset hitch bracket guiding a string of nested carts into a central cart collection area.

Once a sufficient number of carts have been collected, the nested string of carts is typically guided to a central collection area. The nested string of carts are released from the vehicle and each cart is returned to the collection area. One type of collection area accepts the rear wheel of a cart through guided wheel slots. FIG. 7 shows such a rental and return station. A guided wheel slot 70 retains the cart for the next customer. Such collection areas often are designed as rental stations. When depositing money, one cart is released from the wheel slot and when returning one cart, money is received.

The vehicle in FIG. 7 has an offset hitch bracket which correspondingly offsets the path of the nested carts from the path of the vehicle. The offset allows the carts to be guided into the wheel guide slot 70 with the use of the vehicle. In such an arrangement, there is no need to release the carts prior to deposit and manually return each cart.

Although the description of the preferred embodiment and method have been quite specific, modifications of the process of the invention could be made without deviating from the spirit of the present invention. Accordingly, the scope of the present invention is dictated by the appended claims, rather than by the description of the preferred embodiment and method.

We claim:

1. A power operated vehicle, of the type guided by a walking attendant, for conveying a plurality of nestable carts, the vehicle comprising:

a main body portion having a forward end and a trailing end and disposed about a longitudinal axis;

a control handle fixedly connected to said main body portion toward said forward end and offset toward a side of the main body portion, said control handle being configured for one hand operation by an operator walking alongside said main body portion;

a caster, rotatable about a vertical axis, operably connected to the main body portion along the longitudinal axis and adjacent the forward end of said main body portion, said caster being independently movable from said control handle;

a first and a second drive wheel coaxially mounted along opposite ends of an axle, adjacent said trailing and, said axle disposed perpendicular to said longitudinal axis, wherein said caster and said first and second drive wheels movably support the vehicle on a floor surface;

a motor operably connected to said axle, the motor configured to be electrically connected to a power supply;

a hitch pivotably mounted to said main body portion, said hitch pivoting at a point proximal to the axle along the longitudinal axis of said main body portion such that the hitch pivots independent of the movement of said main body portion; wherein objects connectable to said hitch are pulled by said vehicle generally from said trailing end of the main body portion.

2. The vehicle of claim 1 wherein the vehicle possesses a center of gravity, said center of gravity is located above and proximal the center of said axle.

3. The vehicle of claim 1 further including a signal lamp.

4. The vehicle of claim 1 wherein the hitch rotates about the longitudinal axis and pivots relative to said axle in a plane substantially parallel to the floor surface.

5. The vehicle of claim 1, wherein the distance from the point at which the hitch pivots to the center of the axle is within 2 cm to 8 cm of the axle along the longitudinal axis and within 5 cm below the axle.

6. The vehicle of claim 1 wherein the hitch pivots through an angle of about 50° to 60°.

7. The vehicle of claim 1 wherein the motor is disposed within the main body portion such that said motor is protected from outside contaminants.

8. The vehicle of claim 1 further including a means for securing a plurality of nestable carts, said securing means including a rope wound about a drum, the rope having a distal and a proximal end, the proximal end attached to said drum, and a fastening hook disposed on said distal end of said rope for securing a plurality of nestable carts.

9. The vehicle of claim 1 further including a means for braking.

10. A power operated vehicle, of the type guided by a walking attendant, for conveying a plurality of nestable carts, the vehicle comprising:
   a main body portion having a forward end and a trailing end and disposed about a longitudinal axis;
   a control handle fixedly connected to said main body portion toward said forward end and offset toward a side of the main body portion, said control handle being configured for one hand operation by an operator walking alongside said main body portion;
   a caster, rotatable about a vertical axis, operably connected to the main body portion along the longitudinal axis and adjacent the forward end of said main body portion, said caster being independently movable relative to said control handle;
   a first and second drive wheel coaxially mounted along opposite ends of an axle, adjacent said trailing end, said axle disposed perpendicular to said longitudinal axis, wherein said caster and said first and second drive wheels movably support the vehicle on a floor surface;
   a motor operably connected to said axle, the motor configured to be electrically connected to a power supply;
   connecting means for connecting said main body portion to at least one nestable cart, said connecting means adjacent said trailing end such that said nestable cart extends generally rearward from said trailing end; and
   a wheel differential means, such that the first drive wheel rotates independently of second drive wheel, wherein said caster and said wheel differential means define a turning radius of substantially zero.

11. The vehicle of claim 10, wherein the connecting means comprises a bracket having a proximal and distal end, the proximal end pivotably mounted along said longitudinal axis and proximal to said axle such that the bracket rotates through an angle of about 50 to 60 degrees.

12. The vehicle of claim 11, wherein the connecting means comprises a hitch operably connected to said distal end of said bracket, said hitch comprising means for biasing a locking bracket in a locking position, said hitch rotatable about longitudinal axis, said hitch pivotably mounted such that hitch pivots and parallel said axle in a plane substantially parallel the floor surface.

13. A power operated vehicle, of the type guided by a walking attendant, for conveying a plurality of nestable carts, the vehicle comprising:
   a main body portion having a forward end and a trailing end and disposed about a longitudinal axis;
   a handle fixedly connected to the main body portion adjacent the forward end and extending generally vertically from said main body portion and being offset from said longitudinal axis; said handle including a means for controlling the speed of the vehicle and adapted to be grasped and controlled by one hand of an attendant walking alongside of the vehicle;
   a caster, rotatable about a vertical axis, operably connected to the main body portion along the longitudinal axis and adjacent the forward end of said main body portion, said caster being independently movable relative to said handle;
   first and second drive wheels coaxially mounted along opposite ends of an axle, adjacent said trailing end, said axle disposed perpendicular to said longitudinal axis, wherein said caster and said first and second drive wheels movably support the vehicle on a floor surface;
   a motor operably connected to said axle, the motor configured to be electrically connected to a power supply; and
   connecting means adjacent said trailing end for connecting said main body portion to at least one nestable cart such that said nestable cart extends generally rearward from said trailing end.

14. A power operated vehicle, of the type guided by a walking attendant, for conveying a plurality of nestable carts, the vehicle comprising:
   a main body portion having a forward end and a trailing end and disposed about a longitudinal axis;
   a control handle connected to said main body portion;
   a caster, rotatable about a vertical axis, operably connected to the main body portion along the longitudinal axis and adjacent the forward end of said main body portion, said caster being independently movable relative to said control handle;
   first and second drive wheels coaxially mounted along opposite ends of an axle, adjacent said trailing end, said axle disposed perpendicular to said longitudinal axis, wherein said caster and said first and second drive wheels movably support the vehicle on a floor surface;
   a motor operably connected to said axle, the motor configured to be electrically connected to a power supply; and
   a hitch operably connected to said main body portion, said hitch configured to receive at least one nestable cart, said hitch being offset from the longitudinal axis of said main body portion such that said nestable cart pulled by said vehicle travels along a path offset from the longitudinal axis path of the vehicle.

* * * * *